June 12, 1945.　　　E. H. BICKLEY　　　2,377,860
OIL DELIVERY CONTROL SYSTEM
Filed March 25, 1940　　　5 Sheets-Sheet 2

June 12, 1945.  E. H. BICKLEY  2,377,860
OIL DELIVERY CONTROL SYSTEM
Filed March 25, 1940  5 Sheets-Sheet 3

June 12, 1945.    E. H. BICKLEY    2,377,860
OIL DELIVERY CONTROL SYSTEM
Filed March 25, 1940    5 Sheets-Sheet 4

Inventor,
E. H. Bickley,
By M. E. Jones,
Attorney

Patented June 12, 1945

2,377,860

UNITED STATES PATENT OFFICE 2,377,860

OIL DELIVERY CONTROL SYSTEM

Everett H. Bickley, Bala Cynwyd, Pa.

Application March 25, 1940, Serial No. 325,930

17 Claims. (Cl. 73—432)

This invention relates to a control system and aims to provide index or indicating means dependent on and controlled by a differential, particularly the differential of outdoor and indoor temperatures or conditions, and to provide such a system as depends further upon the estimated or predetermined number of acts, services or the like to be performed or rendered over a season or period of time as a result of the indications.

The invention will be described primarily in connection with the delivery of fuel such as oil to tanks associated with burners or furnaces used for heating offices, apartments, private homes, hotels, theatres, stores and other buildings, as one field of use in connection with which the invention has special value.

An important object is to provide such a system whereby the need or desirability for supplying oil to the fuel tanks may be ascertained or indicated accurately at a central location remote to the tanks and depends upon automatic or partially automatic operation or control according to outside atmospheric temperature.

In accordance with the invention, a card or equivalent is provided for each customer on which for instance his name, address, tank capacity, fuel load when the tank is at a safe low level, dates and amounts of deliveries, class of service, kind of oil, remarks or the like are entered, and the cards are usually filed in the office of the merchant and are moved automatically under control of the atmosphere or temperature outside of the office in accordance with the number of estimated deliveries required during a given or average season, in coaction with means which is operable to move the cards of those customers whose tanks are not to be filled without notice to the customer followed by his specific order, to positions which serve to indicate that their supply of fuel is low.

The system is particularly advantageous in that a quick and ready means for routing delivery trucks so that delays and short deliveries are avoided, since the customer has no means of knowing how long a supply of fuel will last and the usual gauge on the oil tank is not accurate and is seldom observed. It should be borne in mind too that if a supply of oil runs too low, the dregs will clog the minute ports of the burner nozzle and cause an expensive repair. Where a dealer has many customers, say several hundred, for example, it is expensive to have his trucks travel from house to house, with the drivers checking up on the quantity of oil in the tank or coal in the bin, besides the liability of errors, and imposing unnecessary work on the billing clerks with small deliveries, besides annoyance of customers.

The more specific objects and advantages will become apparent from a consideration of the description following taken in connection with accompanying drawings illustrating operative embodiments.

Referring specifically to the drawings, wherein like reference characters designate like or similar parts, a plurality of cards 10 are provided, one for each customer, to whom fuel oil, coal, or the like is to be delivered during a season. These cards 10 may be of any suitable size and material and, for instance, are initially the three-inch by five-inch commercial paper or paste-board variety. As well shown in Figure 1, each card 10 along its lower edge portion is cut away from its left hand end, as at 11, leaving a projection or depending portion 12 along such lower edge from the cut-away portion 11 to the right hand edge. The projection 12 may be provided in various ways, such as that shown by way of example, or, for instance, by attaching a supplemental portion to the card. Depending below the lower right hand corner of each card is a spur 13, which may be provided in various ways, for instance, being a pin penetrating, clinched to and suitably fastened by adhesive to the cards, or otherwise.

The cards 10 (Figures 1 and 2) are arranged or filed in a suitable box or receptacle 15, in the manner of a card index, and the spurs or pins 13 penetrate an endless belt or carpet 16, preferably made of a loose, porous textile fabric, which is trained over a pair of rollers 17 and 18, preferably of soft rubber. If desired, rods or partitions 14 may be provided in the box to guide the cards and separate them in groups.

Said cards 10 are preferably printed blanks containing spaces for entry of a customer's name, address, tank capacity, fuel load when the tank is at a safe low level, dates and amounts of deliveries, class of service, kind or grade of oil, remarks, and the like. Through the medium of means to be later described, the upper run of the belt 16 travels from right to left, in Figures 1 and 2, at a very slow rate, for instance, only approximately twelve inches in a six months' period or season, where there are average temperature changes, as in the vicinity of Philadelphia, Pennsylvania.

Figure 2:
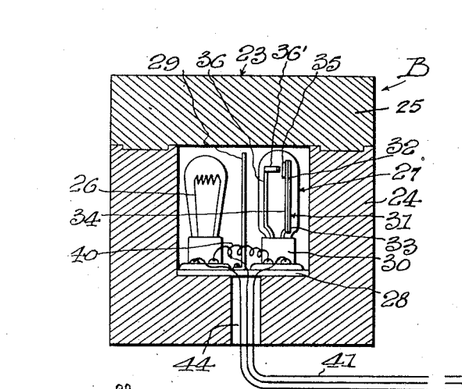
Figure 2 is a plan view of the service indicator or index means of Figure 1.
Figures 2, 7A, 11:
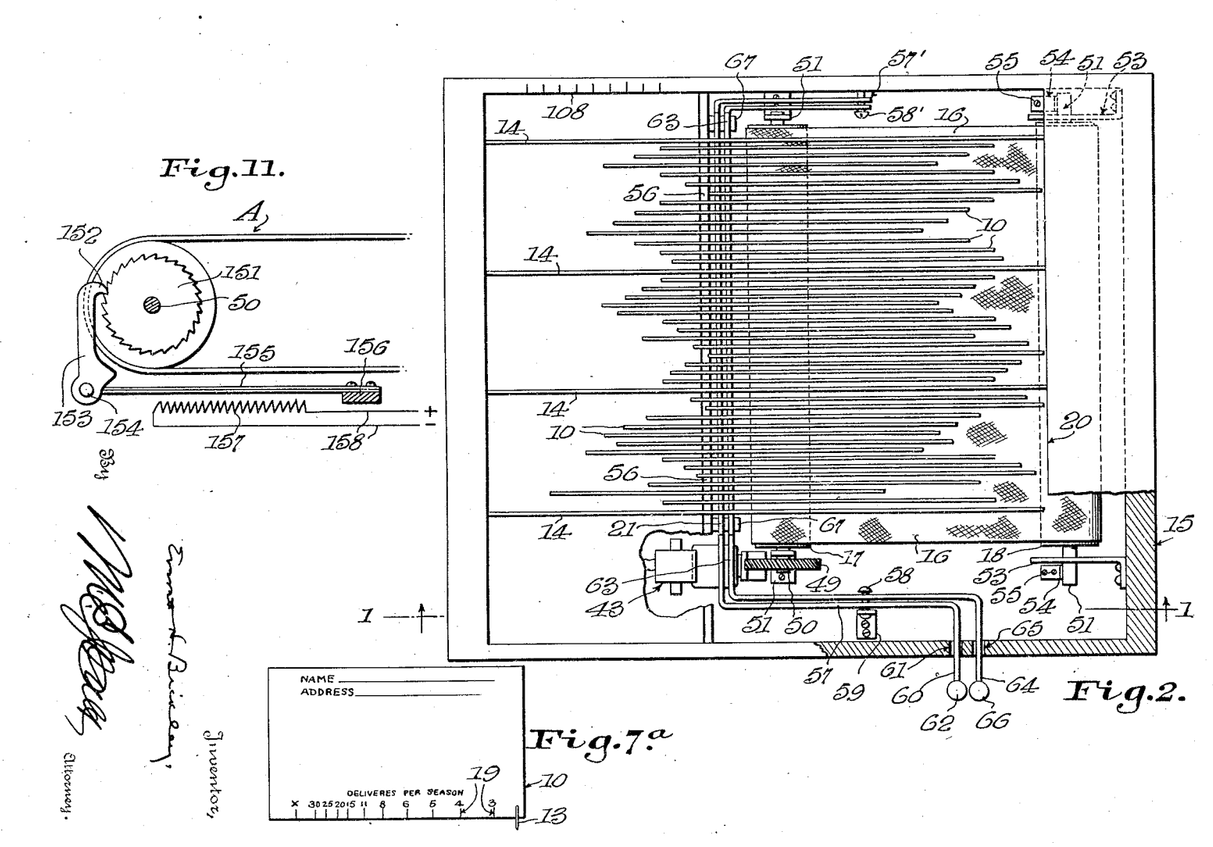
Figure 7a is an elevation of a delivery card alone.
Figure 11 is another modified form partly and fragmentarily in side elevation and section.

Along the lower edge of the cards as shown in Figure 7a, I provide a scale, indications, or calibrations, as at 19, and such scale is used to indicate the number of deliveries required by a customer represented by the card per season, in determining the extent to which the card is to be cut away to provide the space 11. The use of this scale 19 and provision of the space 11 is as follows: A study of Weather Bureau Reports indicates that a twelve inch movement of the cards 10 during a winter season is sufficient to carry out the present system. The minimum number of deliveries to a single customer would be three, requiring a movement of one-third of twelve inches, or four inches. When the card 10 is placed in the box 15 with the right hand end or edge of the card abutting a wall or shoulder 20 therein, a mark is made on the card directly over a lifting bar 21, to be later specifically described. I now measure four inches to the right of this mark and place the figure 3. Thus, for a customer requiring four deliveries per season, the movement would be one-fourth of twelve inches, or three inches, and measuring three inches from the above mentioned mark over a lifting bar 21, I place the figure 4. This system is followed for 5, 6, 7, 9, 11, 15 to 30, or any other desired number of deliveries. The cards are cut away to the left of the figures placed thereon according to the method mentioned, and which govern spaces cut out at 11 and location of the shoulder 22 at the left-hand end of projection 12. A non-uniform scale or series of shoulders 22 and spaces 11 are thus provided on the lower edge of all of the cards. From an examination of the previous year's consumption of oil, or of the consumption of oil for any given year or a period or a number of years, the size of the ideal load for the storage tank, the proper number of deliveries is arrived at and the lower edge of the card clipped at 11, as described. After clipping of the cards, they are filed or inserted in the box 15 simultaneously with a filling of the respective tanks to which they correspond, with the right hand edge or end of the cards in contact with the shoulder 20.

The filing box 15 is kept within the office of the merchant or otherwise indoors, while a box or casing 23 is kept out of doors, as on a shelf, at the office of the merchant or otherwise, where it will be subject to average outside weather changes, the box preferably being exteriorly painted to prevent water absorption. Such box may be made of a suitable heat insulating material and, for instance, of a mixture of slag concrete and spun glass. Box 23 has a container section 24 and a cover 25, and within the section 24 an electric heating device 26 is provided, which may be a lamp, coil of resistance wire, or the like, which coacts with a thermostatic switch 27, also located in the box. A base 28 in the box supports the heater 26 and thermostatic switch 27, and also supports a shield 29 located therebetween, to prevent the direct rays from the lamp 26 striking the thermostatic switch 27.

Said thermostatic switch 27 has a base 30 from which an evacuated bulb or envelope 31 extends, within which a thermostatic strip 32 is located which is composed, for instance, of a strip of brass 33 having a strip of steel 34 welded to the same. The latter has a hardened steel contact member 35 welded to it in spaced and opposed relation to a weak hard steel permanent magnet 36' carried by a contact 36. The thermostatic strip 32, contact 35, magnet 36' and contact 36 are contained within the vacuum or envelope 31 in order to prevent oxidation at the contact surfaces. The action of the magnet 36' causes rapid engagement with contact 35 and rapid disengagement giving clean action.

Electric current from any suitable source is supplied to the heater 26 and thermostatic switch 27 through feed wires 37 and 38, which preferably lead from a plug 39 adapted to be connected to the source. The other terminals of said heater 26 and thermostatic switch 27 are joined by a conductor 40 from which a conductor 41 leads and which in association with a conductor 42 which is tapped to conductor 37 supplies electric current to a motor 43. The various conductors enter box 23 through a passage or conduit 44 and the conductors 41 and 42 enter the box 15 through a passage or conduit 45. Said motor 43 is of any type or capacity and, for instance, may be of the usual type which operates an electric clock. The shaft of the motor 43 is designated 46, and the motor is supported by suitable brackets 47 fastened to the box 15. Fast on the shaft 46 is a worm 48 enmeshed with a worm wheel 49, in turn fast on the shaft 50 of the previously described roller 17. Said shaft 50 is journaled in suitable bearings 51 fastened within the box 15.

Roller 18 has a shaft 51 which is slidably and rotatably mounted in elongated slots 52 of bearings or brackets 53 fastened within the box 15. The belt 16 is maintained taut since leaf springs 54 contact the shaft 51 and urge it away from the shaft 50, the leaf springs 54 being fastened as at 55, interiorly of the box 15.

It will be noted that an inclined or deflecting surface is provided within the box 15, at 56, located in the path of movement of the shoulders 12 of the cards 10 to the left, so as to cause the cards to tilt or move upwardly at the left-hand end, in the event the cards are not first lifted by the device 21 and thereupon removed.

Concerning said lifting bar 21, it is generally of U-shape in plan, as shown in Figure 2, thus having a side portion 57 which is pivoted by a pin 58 to a bracket 59 fastened to the bottom of the box 15 and a side portion 57' pivoted at 58' to the box. A manipulating portion 60 extends outwardly from the portion 57 through an opening 61 in a side wall of box 15 where it is preferably terminally equipped with a key 62 to facilitate depression in order to lift the bar 21 so that it will engage any of the projections 12 located above the same, and thereby lift or tilt the left-hand portions of the engaged cards 10, so that they will extend above the remaining cards 10, to indicate customers at that time requiring delivery of oil or fuel, the lifted cards being removed, entries made thereon, and then replaced in the box 15 with their right-hand ends contacting the shoulder 20 of box 15 and their spurs 13 penetrating the belt 16.

Some customers insist upon being notified when their fuel supply is low and upon ordering the fuel before delivery is made to them. In order to be able to give such notice, at the proper time, the card is clipped ¼" to the left of the point as indicated by the scale on the card. A lifting bar 63 of substantially the same shape and size as lifting bar 21 is pivoted on the pins 58 and 58' and has a lateral portion 64 extending through an opening 65 in the box 12 to the exterior where it is terminally equipped with a key 66. In the travel of the cards 10, they will move over the bar 63 before moving over the bar 21 and, hence, upon depressing key 66 the cards having projections 12 in line with the bar 63 will be raised, thus indicating those customers who will need fuel in advance of a holiday, over a week-end, or the like. Following this, such cards are removed and later replaced with their right-hand edges in contact with the shoulder 20 and their spurs 13 penetrating the belt 16. Bars 21 and 63 normally rest on one or more shelves 67 depending from the wall for example.

To explain the operation of the invention, it will be realized that the space or interior of the box 23 is held at a constant average temperature and that the contacts 35 and 36 are adjusted so that such temperature is about 69½° F. or 70° F. Since the box is located out of doors, it will be subject to average weather changes and the length of time which the contacts 35 and 36 are closed in any period is proportional to the heat loss through the walls of the box 23 and this, in turn, is proportional to the difference of temperature between the inside and the outside of the box. Tests have shown that the amount of oil consumed by an oil burner controlled by a thermostat and the amount of coal consumed by a furnace controlled by a thermostat are closely proportional to the difference of temperature between the outside temperature and the inside temperature of 70°. The thermostatic action of the contacts 35 and 36 is also used to control the operation of the motor 43 and the other movable parts within the box 15. As previously stated, the motor 43 is geared down so that it operates the parts very slowly in order to move the upper run of belt 16 to the left approximately twelve inches in a six months period with the average temperature changes as exist in the vicinity of Philadelphia, Pennsylvania, for instance. The belt 16 is shown as one example of carrier only, and it is to be understood that any equivalent carrier may be provided to move the cards, or the like, slowly and proportionately to the weather variations below any suitable temperature, such as 70°. The movement of the belt or carrier 16 moves the cards from the position where they contact the shoulder 20, to the left. When the amount of fuel has been consumed due to the weather below 70° corresponding to one delivery, the card will have moved to the left a distance sufficient to dispose the cut edge 11 and adjacent portion of the projection 12 over the lifting bar 21. If it is now desired to determine which customer or customers require a delivery of fuel, the key 62 is manually depressed and the bar 21 will engage or contact only those cards which have moved sufficiently to the left for their portions 12 to extend over the same and be engaged and lifted or tilted above the other cards, by the bar 21. Such tilted card or cards will then be removed from the file or box 15 and used in arranging a delivery route by a merchant, after which such cards are marked to indicate the amount of oil delivered, the date, and other desired data, following which the card is again inserted in the file or box 15, preferably in alphabetical order, and in contact with the wall 20, with pin or spur 13 penetrating the belt or carrier 16.

Key 66 is depressed to lift the bar 63, when it is desired to deliver fuel to customers in advance of a holiday etc. As this lifting bar 63 is located a short distance in advance of the other lifting bar 21, the need for fuel will be indicated to the merchant a day or any other desired predetermined period of time in advance of complete depletion of the supply of fuel on hand.

If manual operation of the bar 21 is not desired, it will be realized that the portion 12 at the lower left-hand corner of each card will, through the travel of the belt, engage and ride up the incline 56, lifting the left-hand end of said card or cards above the remaining cards, automatically, so that they may be removed and used in the same manner and for the same purposes as set forth with respect to the cards tilted or lifted through actuation of the lifting bar 21 through depression of the key 62.

It is to be understood that the embodiment of the invention so far described is by way of example only since the same may assume various forms and may also have numerous applications. Although it has been particularly described with respect to the delivery of oil or other fuel, its principles may be advantageously used in connection with the control of irrigation, lubrication of machinery, in hospitals, or elsewhere where it is desired to give or perform service at variable intervals depending not only on the thing or means served, but also upon the amount of service, use and condition of operation. A full history is always obtainable by inspection of the cards 10, which are filed alphabetically. The periodicity of service is under the control of the location of the cut or shoulder 22 on each card, and the control can respond to heat, light, humidity, flow of fluid, and the like.

The box 15 and its contents may be referred to generally as a service indicator, and in this connection is identified as a whole as A, while the box 23 and its contents may as a whole be termed and identified as an outdoor thermostatic actuator device B.

Figure 3:
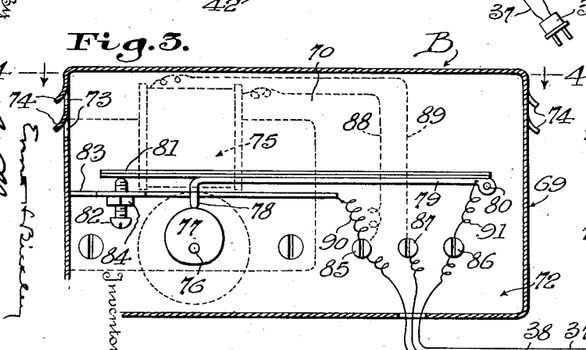
Figure 3 is a vertical sectional view through a second form of thermostatic actuator device.
Figure 4:
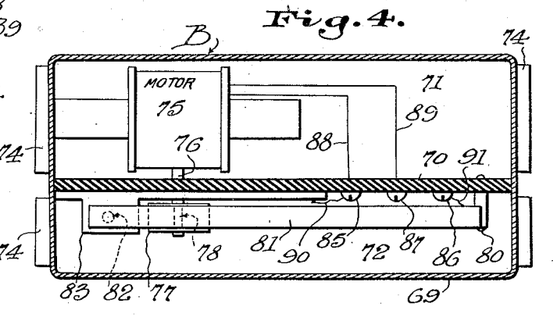
Figure 4 is a cross section taken on the plane of line 4—4 of Figure 3.

In Figures 3 and 4, I show one modified form of the said outdoor thermostatic actuator device B. This device consists of a metallic or other box or casing 69 having a horizontal partition or septum 70 of Bakelite therein, providing chambers 71 and 72 on opposite sides thereof, each provided with openings 73 to facilitate escape of heat and which are guarded by louvers 74. Mounted in the chamber 71 is a constant speed electric motor 75 which is geared down so that its shaft 76 will travel very slowly as at one revolution per hour. Said shaft 76 extends through the partition 70 into the chamber 72 where it is equipped with a heart-shaped cam 77, for instance, of iron, which is adapted for coaction with a hardened steel rider 78, depending from a metallic lever 79, pivoted on a rod 80 fastened to the partition 70. A thermostatic metallic strip 81 is fastened to lever 79 for movement bodily therewith and it projects beyond the rider 78 and coacts with an adjustable screw 82 threaded through a metallic bracket 83 secured to the partition 70 and on which adjusting screw a lock nut 84 is threaded.

Binding posts 85, 86 and 87 are provided on the partition 70 and the conductors 37 and 38 of the previously described form lead to the binding posts 85 and 87, respectively. From the binding posts 85 and 87, conductors 88 and 89 lead to the motor 75. Another conductor 90 leads from binding post 85 to the bracket 83, and a further conductor 91 leads from binding post 86 to the lever 79. The conductors 41 and 42 of the preceding form are connected, respectively, to the binding posts 86 and 87. Conductors 41 and 42 are connected to the identical service indicator A employed in the preceding form.

In the form of the thermostatic actuator device B of Figures 3 and 4, the screw 82 is adjusted until contact is just made with the thermostatic arm 81 with the rider 78 resting on the high point of the cam 77, for a temperature of minus 20° F. Said rider 78 lifts during 180° of its rotation in proportion to the angle rotated and falls for the next 180° of the rotation of the shaft, proportionately to the angle rotated, the total lift being equivalent to the amount the rider 78 is moved, when the thermostatic metal strip 81 is subjected to a change of about 90° F. Rotation of the cam 77 at the adjustment for minus 20° F. fails to interrupt the circuit through the motor 43, thus the motor 43 will run constantly at 20° below zero. At a temperature of 70° F., that is 0° differential, the thermostatic metal of the strip 81 will bend upwardly, lifting the thermostatic arm 81 so that there will be no portion of the hour when contact is made for causing said motor 43 to run. By proper proportioning of the ratio of the worm 48 and worm wheel 49, the belt 16 is caused to move the desired amount during the winter season. For example, the motor 43 running continuously, should move the belt 16 about one-fourth of an inch in twenty-four hours.

Figures 5, 6, 7:
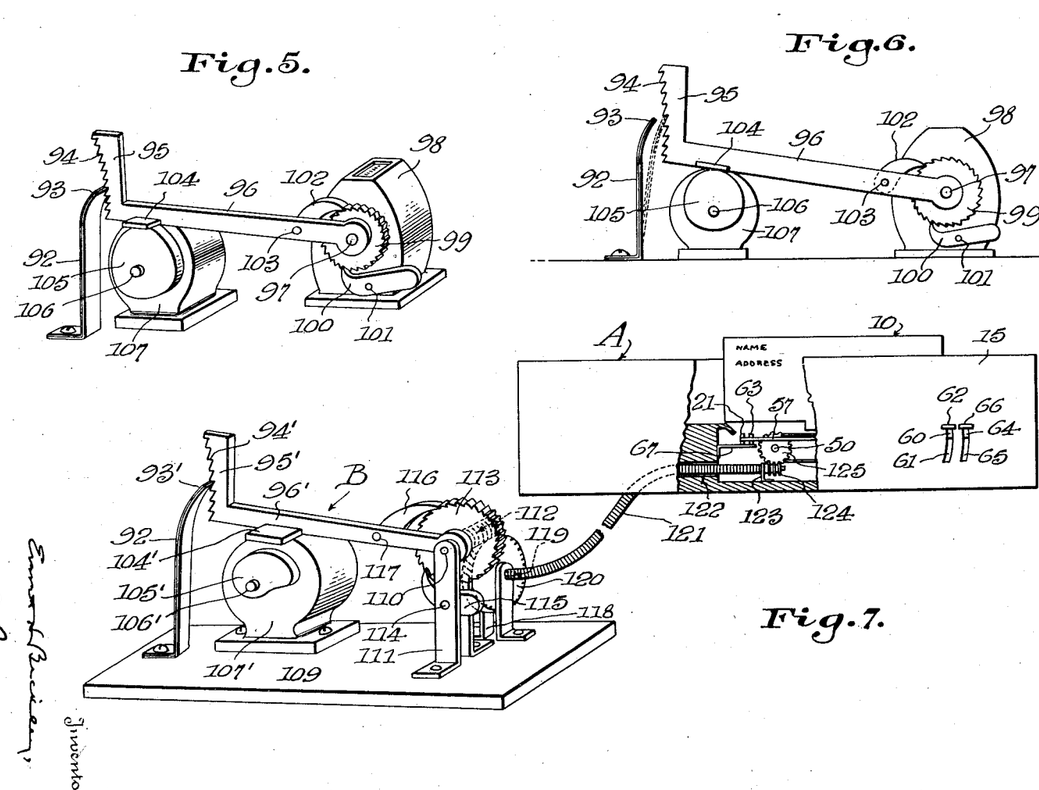
Figure 5 is a perspective view of an integrator counter which may be used in connection with the service index.
Figure 6 is a side elevation of the device of Figure 5, the action of the thermostat being suggested in full and dotted lines.
Figure 7 is a composite view partly in perspective, elevation and broken away of a modified form of the invention with respect to both the thermostatic actuator device and the service indicator.

In Figures 5 and 6, I show an integrator and counter device which may be run or operated as an auxiliary to the service indicator A and thermostatic actuator device B. Such device of Figures 5 and 6 is suitably mounted out of doors so as to be subject to outside temperature. It has an upstanding strip of thermostatic metal 92 whose upper end is curved as at 93 for coaction with teeth 94 on a segment 95 of a lever 96 pivoted on an actuating shaft 97 of a conventional counter 98. Rigid with the actuating shaft 97 of the counter is a ratchet or wheel 99 with the teeth of which a pawl 100 is engaged to prevent retrograde rotation thereof, the pawl being pivoted as at 101 to the casing of such counter 98. A pawl 102 actuates the ratchet wheel 99 and it is pivoted at 103 on the lever 96. Lever 96 is adapted at a lug 104, to contact the periphery of a cam 105 fastened to a shaft 106 of a motor 107. Motor 107 is usually a hand wound clock works which drives the shaft 106 one revolution per hour.

The teeth 94 are in a path which is not concentric with the axis of a shaft 97, but are disposed in an arc so that the highest tooth is at a greater distance from the shaft 97 than the lowest tooth, the distance being equal to the motion which the end 93 of the thermostatic strip 92 follows from the change of 90° in temperature, more or less.

During rotation of cam 105, it lifts the lever 96 and the actuating or integrating wheel 99 is turned by the action of the pawl 102. After the highest point of the cam 105 has passed, lever 96 drops by gravity, with pawl 102 slipping and the pawl 100 holding, until its drop is arrested by the end of the thermostatic metal strip 92 engaging one of the teeth 94. Descent of such lever 96 thereupon stops until cam 105 again contacts the lever at lug 104 and starts to lift the lever. Changes in temperature will cause the thermostatic strip 92 to bend, thereby changing the position at which the thermostatic strip 92 engages a tooth 94 and arrests the descent of lever 96. The readings of the counter 98 will indicate the accumulated average temperature difference below 70° in some appropriate scale which may be delineated on the box 15, as at 108 in Figure 2.

Another modified form of the invention is illustrated in Figure 7. Such form operates independently of electrical energy and is for installation where controlled frequency alternating current is not available. This form of Figure 7 has an outdoor thermostatic actuator device B. Such device is housed within a suitable casing outdoors, and the operating parts are supported by a base, as at 109. On such base a thermostat 92' is fastened which has an end portion 93' coacting with teeth 94' of a segment 95' on a lever 96' provided with a lug 104' coacting with a cam 105' driven by a shaft 106' of a motor 107'. All of the parts from 92' to 107' correspond to the same parts unprimed, as shown and described in and with reference to Figures 5 and 6, their action and operation being the same. In this instance, a transverse shaft 110 is journaled in the upper portions of brackets or springs 111 supported on the base 109. Shaft 110 carries a worm 112 and also carries an integrator or ratchet wheel 113. Lever 96' is pivoted on the shaft 110 between the brackets 111 and the latter by means of a pin 114 pivot a pawl 115 which prevents retrograde rotation of the ratchet wheel 113. The latter ratchet wheel is actuated by a pawl 116 pivoted at 117 to the lever 96'.

A pair of brackets or bearings 118 are supported on base 109 and journal a shaft 119 on which a worm wheel 120 is fast and which is enmeshed with the worm 112. Shaft 119 is coupled to and drives the flexible shaft 121 which extends through a passage 122 in the box of the service indicator A, within which service indicator it is journaled in a bearing 123 and carries a worm 124 enmeshed with a worm wheel 125 fast on the shaft 50 therein. This service indicator A, otherwise than modified by the parts 121 to 125, conforms to the disclosure thereof in Figures 1 and 2 and the service indicator A and thermostatic actuator device B coact to produce the same results as in the form of the invention disclosed and described with specific reference to Figures 1 and 2, that is, the operation is dependent upon and controlled by the temperature differential between minus 20° F. and 70° F., or within any other range, according to the particular thermostat 92' employed, and the proportioning and coaction of the other parts accordingly.

Figure 1:
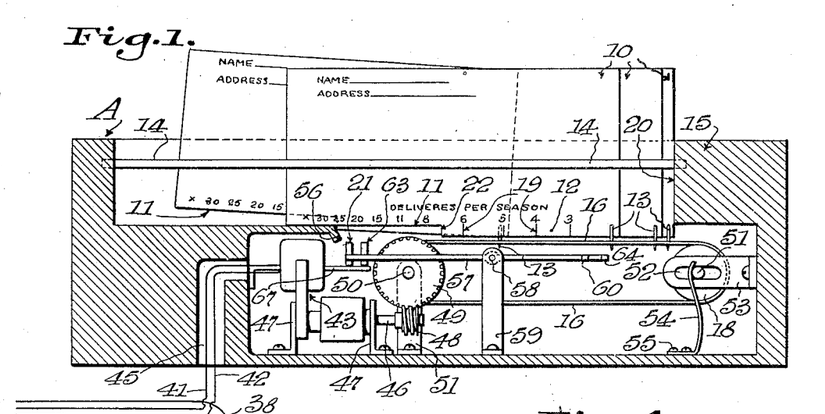
Figure 1 is a longitudinal vertical sectional view through one form of the apparatus taken substantially on the plane of line 1—1 of Figure 2.
Figures 8, 9, 10, 15, 16:
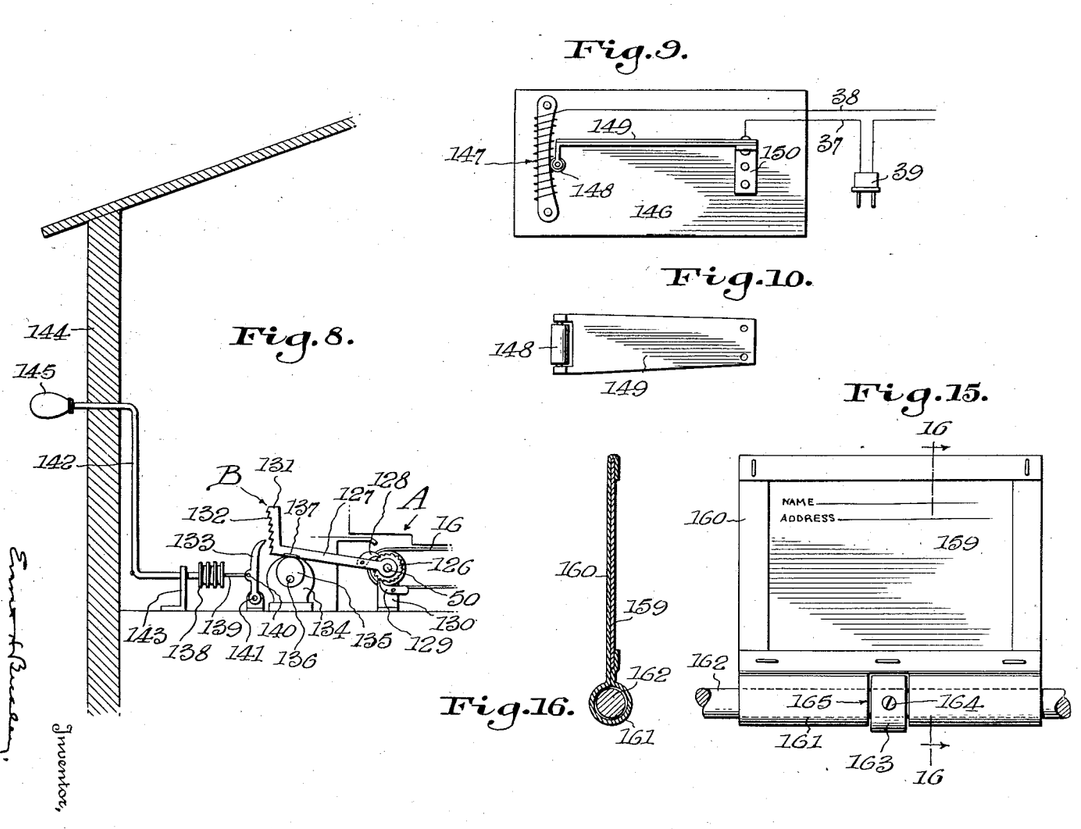
Figure 8 is a view in elevation in connection with a section through the wall of a building, suggesting a further modified form.
Figure 9 is a plan view of a modified form of thermostatic control.
Figure 10 is a plan view of the thermostatic strip of the form of Figure 9.
Figure 15 is an elevation of one of the index cards and carrier or envelope as used in the form of Figure 12.
Figure 16 is a sectional view taken on the line 16—16 of Figure 15.

With respect to the modified form of Figure 8, the service indicator A substantially conforms to that shown in Figures 1, 2, or 7. Its shaft 50 has an integrator or ratchet wheel 126 keyed thereto for actuation, in order to drive the belt 16, and associated parts, to move the cards 10. Pivoted on shaft 50 is a lever 127 identical with those employed at 96 and 96', the same having a driving pawl 128 pivoted thereto and a pawl 129 pivoted on bearing or bracket 130 to prevent retrograde movement of the ratchet wheel 126. Said pawls 128 and 129 correspond to those at 102 and 100, respectively, or at 116 and 115, respectively. The segment 131 of lever 127 has teeth 132 arranged like those at 94 and 94', and a detent pawl 133 is adapted to move into and out of the path of the teeth 132 to arrest the descent of the lever 127, such detent 133 being actuated by thermostatic means, according to the outside atmosphere and 70° temperature differential, whereby the detent 133 in coaction with the teeth 132 will cause the service indicator A to operate like in the preceding forms. With this form, a spring or clock motor, such as an eight-day clock motor, is employed at 134 with a cam 135 fast on its shaft 136, such parts 134, 135 and 136 corresponding to and functioning similarly to those at 107', 105' and 106', the cam 135 being directly engageable with a lug 137 carried by the lever 127, and corresponding to the lugs 104 and 104' of preceding figures.

As to the thermostatic means for controlling the position of the detent 133, the same consists of an expansible bellows at 138 connected by a link 139 pivoted at 140 to the detent 133, which latter is pivoted at 141. A pipe 142 is mounted by a bracket 143 and in the wall 144 of a building. Exteriorly of such wall 144, a bulb 145 is attached to the adjacent terminal of the pipe 142. Within the bellows 138, pipe 142 and bulb 145 there is an expansible fluid whose contraction and expansion is governed by the outside or outdoor temperature in order to move the detent 133 into the path of movement of the teeth 132 to control the operation of the service indicator A. It will be realized that, with the exception of the bulb 145 and the adjacent end of the pipe 142, all other parts are located within a building and subjected to the atmosphere thereof, usually at a temperature of 70°.

Referring now to the form shown in Figures 9 and 10, this form is adapted to be exposed to the outside atmosphere. It has a base 146 to which a conventional resistor 147 is operatively fastened and engageable with which is a contactor of conducting material 148. Contactor 148 is carried by a strip of thermostatic metal 149, preferably of two kinds of metal having different coefficients of expansion, and which strip is fastened to a bracket 150 on the base 146. Electrical current is supplied through the conductors 37 and 38, as employed in the first form of the invention, the former being connected to the thermostatic strip 149 and the latter to the resistor 147. The said conductors 37 and 38 in Figures 9 and 10 are adapted to be connected, respectively, to the conductors 42 and 41 of Figure 1, or any equivalent in order to actuate a service indicator A, in accordance with the principles of the invention.

In Figure 11, which is a further modified form, a ratchet wheel or integrator 151 is fast on the shaft 50 of a service indicator A, but fragmentarily shown in the instant figure. This ratchet wheel 151 is engaged by a bill 152 of a pawl 153 rigidly carried at 154 at the free end of a thermostatic bar or strip 155 mounted at 156. Such thermostatic bar 155 is disposed adjacent to resistance of a heating coil at 157 adapted to receive current through feed wires 158, which feed wires 158 are connected in any suitable manner in an electric circuit which controls the energization or heating of coil 157 in proportion to the differential between inside and outside temperatures, it being clear that when the thermostatic strip 155 heats it will raise, disengaging the pawl 153 from the ratchet 151, but when the same cools, it will move downwardly, moving the pawl 153 against teeth of the ratchet wheel 151 and also downwardly thereby rotating the ratchet wheel 151 correspondingly.

In the remaining form disclosed in Figures 12 to 16, I illustrate an adaptation of the invention to that type of card index where the cards are retained in clips or transparent pockets and separated a fraction of an inch so that they may hang in a rack with the names of the customers visible at the lower edge portion of the cards to facilitate more rapid reference thereto. The cards in this form are designated 159 and are retained by transparent or equivalent backings 160 in the form of envelopes or retainers. Such backings 160, by means of tubes or coil portions 161, are freely rotatable on rods 162, but are held against sliding movement of the rods by means of detachable abutments or collars 163 fastened thereto by screws 164 fitted in cutout portions 165 between the ends of the tubes 161.

The rods 162 are disposed in parallelism and are slightly spaced apart and have opposite end portions extending through longitudinal slots 166 of suitably mounted hollow or channeled frame members 167. The channeled members 167 may be vertically disposed, as suggested in Figure 13, so that the retainers 160 and cards therein will hang or the structure may be such as is adapted for arrangement horizontally or at an angle.

Pairs of rotatable rollers 168 are suitably journaled in the channeled frame members 167 and have soft rubber or equivalent peripheral coverings 169, which cause the rods 162 to slide laterally and in parallelism, through the rotation of the rollers and their frictional grip or contact with the rods 162. Attention is called to the fact that while the frictional grip of the rollers with the rods 162 is sufficient to slide the rods 162, yet the same is of such a degree that the rods may be manually pushed or moved laterally counter to the frictional engagement as is necessary in positioning the rods and backings thereon. Rollers 168 rotate so as to slide the rods 162 to the left in Figures 12 and 14 and one pair of rollers 168 has intermeshing gears or pinions 170 fast thereon, with one of which enmeshed with a worm 171. Said worm 171 is fast on a shaft 172 of a motor 173, the shaft preferably being journaled in bearings 174. The motor 173 is located within one of the channeled frame members 167.

Said motor 173 may be an electric motor and correspond to that disclosed at 43 in Figure 1 with its operation controlled by the same out door thermostatic actuator device B, as employed in that form. Likewise, it may be operated by the actuator B of Figure 7, if preferred, with the worm 124 of that form disposed in driving engagement with one of the worm wheels or pinions 170, or any of the other suggested thermostatic controlled driven means may be employed to operate one of the pinions 170.

Figures 12, 13, 14:
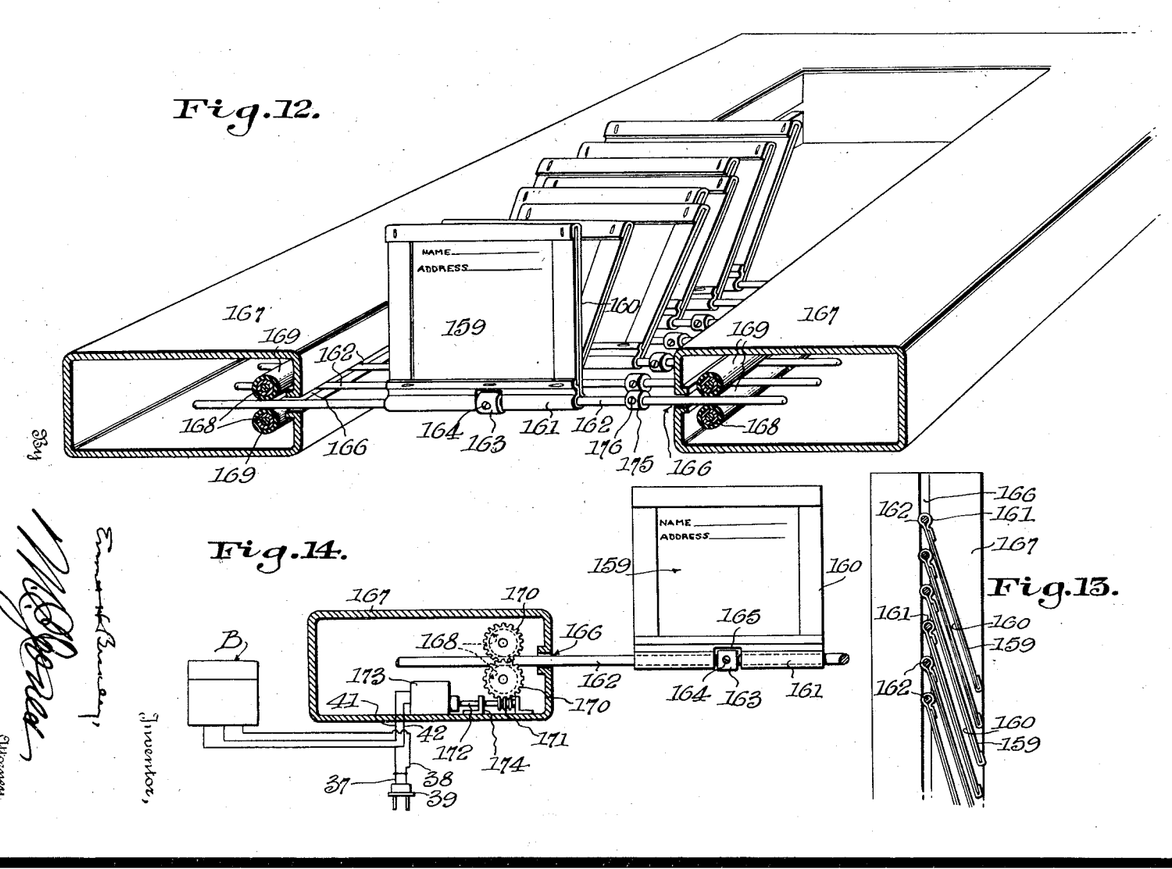
Figure 12 is a perspective view of the last modified form, the same being partly broken away and in section to disclose details.
Figure 13 is a central longitudinal sectional view through a portion of the device of Figure 12 in which the latter is disposed vertically.
Figure 14 is a partial transverse sectional view of the device of Figure 12.

It will be noted that stops 175 are fastened adjustably to the rods 162 as by means of screws 176.

According to this form of the invention of Figures 12 to 16, movement of the cards 159 and backings 160 to the left in Figures 12 and 14 into abutment or practically into abutment with the left hand channeled member 167 will indicate when fuel oil should be delivered to a customer, and the extent of such movement is determined in the same way as explained with respect to the form of the invention in Figures 1 and 2, to locate the shoulder 22 or length which projection 12 is from the right hand end of the card 10. When this movement has been ascertained, the cards 159 and their backings 160 are properly positioned by manual movement, the associated rod 162 sliding therewith counter to the friction of the roller coverings 169, following which the stops 175 are adjusted to a position contacting the right hand channeled member 167, in which position they are fastened by the screws 176 rigidly to the rods carrying them. Thereafter, when a card 159 is moved into contact with the left hand channeled member 167, it will be an indication that the customer named on the card requires a delivery of oil or other fuel. After appropriate action has been taken to deliver the oil and mark the card, it is again moved to the right in Figures 12 and 14 with stop 175 thereof engaging the right hand channeled member 167, whereby the card is subject to another movement, at the end of which, its position will indicate that the customer requires another delivery of fuel.

What is claimed is:

1. In combination, a conveyor, means operable to variably move said conveyor, a device for automatically controlling the operation of said means, said device being exposed to outside atmosphere and having an interior space, heating means to maintain the interior space of said device at a predetermined temperature including a thermostat in said space of said device controlled by the differential of temperature within said device and of the atmosphere surrounding said device, individual removable record cards, and means for attaching said cards removably to the conveyor at predetermined points on the latter, whereby the cards are advanced by the variable movement of the conveyor to correspond to estimated service demands of customers represented by the cards.

2. In combination, a lever, driven means including a cam operable against the lever, said lever having teeth disposed at different distances from its axis of movement, thermostatic pawl means subject to a temperature differential to move into and out of coacting relation with said teeth to control the position of the lever and its operation by said driven means, and indicating mechanism operable through movement of the lever.

3. In combination, a lever, driven means including a cam operable against the lever, said lever having teeth disposed at different distances from its axis of movement, thermostatic pawl means subject to a temperature differential to move into and out of coacting relation with said teeth to control the position of the lever and its operation by said driven means, gearing operable by said lever including a flexible shaft, and indicating mechanism operable by said flexible shaft.

4. Mechanism of the class described comprising a variably driven conveyor belt, mounting means therefor, record cards, means to attach the record cards at selective locations along the belt for advancing movement by the belt, said mounting means having a part functioning as a cam engageable by the record cards after advancement to correspond to service demands of customers represented by the cards to eject them by movement away from the conveyor belt.

5. Mechanism of the class described comprising a driven conveyor belt, mounting means therefor, record cards, means to attach the record cards at selective locations along the belt for advancement by the belt, said record cards along their lower edges having notches and projections, and lifting means below said cards over which the notches are initially disposed and over which the projections are adapted to move through advancement of the conveyor belt for ejecting engagement by the lifting means, the notches functioning to render premature operation of the lifting means ineffective.

6. Mechanism of the class described comprising a driven belt, mounting means therefor, index members, means to attach the index members at selective locations along the belt for movement by the belt, said mounting means having a part functioning as a cam engageable by the index members for predetermining movement to raise them relatively to the belt, said members having cut away portions and projections along their lower edges, a plurality of individually operable lifting members over which the cut away portions are initially disposed and over which the projections are moved by the belt.

7. Mechanism of the class described comprising parallel indicator rods, driving rolls therefor between which the rods are slip-connected and frictionally gripped, whereby the rods are movable transversely of the rolls to vary their relative positions, and means operable to drive said rolls according to a temperature differential including a control box, heating means to maintain the interior of the control box at a predetermined temperature, and thermostatic means in the box subject to a temperature differential between the interior of the box and the atmosphere surrounding it.

8. Mechanism of the class described comprising parallel indicator rods, driving rolls therefor between which the rods are slip-connected and frictionally gripped, whereby the rods are movable transversely of the rolls to vary their relative positions, adjustable stop means to govern the starting position of the rods, means to drive the rolls, intermeshing gears on certain of the rolls, a motor to drive said gearing, a control box, heating means to maintain the interior of the control box at a predetermined temperature, and thermostatic means in the box subject to a temperature differential between the interior of the box and the atmosphere surrounding it.

9. In combination, a conveyor, means operable to variably advance said conveyor through the heating of an atmosphere maintained at a constant predetermined temperature through dissipation of heat from said atmosphere, removable card record members partaking of the movement of said conveyor, said card record members having means thereon proportioned in accordance with estimated service demands of customers which they represent, means on each card record member for attaching it to said conveyor at selective locations, and means coacting with the second mentioned means engageable with the latter after predetermined movement of the conveyor to eject the card record members.

10. In combination, a conveyor having similar successive movements in the same endless path, means operable to impart said movement to the conveyor in accordance with and through the heating of an atmosphere maintained at a constant predetermined temperature through dissipation of heat from said atmosphere, card record members, means for securing said card record members individually at selective locations to the conveyor for advancement by the latter, said card record members having means thereon proportioned in accordance with estimated service demands of customers represented by the card record members, and means coacting with the second mentioned means engageable with the latter after predetermined movement of the conveyor to eject the card record members.

11. In combination, a conveyor, card record members, devices to attach the card record members individually to the conveyor at selective locations on the latter, and operating means for the conveyor functioning through the heating of an atmosphere maintained at an approximately constant predetermined temperature through dissipation of heat from said atmosphere to advance the card record members, said card record members having means thereon proportioned in accordance with demands of customers represented by the card record members, and means coacting with the second mentioned means engageable with the latter after predetermined movement of the conveyor to eject the card record members.

12. In combination, a conveyor, card record members, devices in the nature of a pin on each card record member to attach the latter individually to the conveyor at selective locations on the latter, and operating means for the conveyor functioning through the heating of an atmosphere maintained at an approximately constant predetermined temperature through dissipation of heat from said atmosphere to advance the card record members, said card record members having means thereon proportioned in accordance with demands of customers represented by the card record members, and means coacting with the second mentioned means engageable with the latter after predetermined movement of the conveyor to eject the card record members.

13. In combination, a movable conveyor, means operable to move said conveyor in accordance with degree-day temperature readings, record cards each having means on one edge portion for selective attachment to said conveyor, said cards having notches and projections along their lower edges proportioned in accordance with fuel demands of the customer represented by the card, independently operable lifting devices disposed below said cards and one in advance of the other, whereby upon operation of said lifting devices cards the projections of which have been advanced to overlie the lifting devices will be raised.

14. In combination, a movable conveyor, means operable to move said conveyor in accordance with degree-day temperature readings, record cards each having means on one edge portion for selective attachment to said conveyor, said cards having notches and projections along their lower edges proportioned in accordance with fuel demands of the customer represented by the card, and means which said projections are adapted to overlie through advancement of the card by the conveyor, the last mentioned means being operable to eject cards which have been advanced to overlie the same.

15. In combination, a conveyor, means operable to variably move said conveyor, a device for automatically controlling the operation of said means, said control device being exposed to outside atmosphere and having an interior space, heating means to maintain the interior space of said device at a predetermined temperature, individual card record members having means actuated by said conveyor rendering said members subject to advancing movement of the conveyor imparted from selective locations of the conveyor, and means operable to eject the said members relatively to the conveyor after predetermined movement thereof with the conveyor in accordance with service demands of customers represented by the members.

16. In combination, a movable conveyor element, means operable to variably move said element, a device for automatically controlling the operation of said means, said control device being exposed to outside atmosphere and having an interior space, heating means to maintain the interior space of said device at a predetermined temperature, individual indicating cards having means to advance them through advancement by the element imparted from selective locations on the element, and means movable towards said cards bearing a relation to their shape so as to eject the cards individually in accordance with service demands of customers represented by the cards dependent on the position of the cards.

17. In combination, a movable conveyor element, means operable to variably move said element, a device for automatically controlling the operation of said means, said control device being exposed to outside atmosphere and having an interior space, heating means to maintain the interior space of said device at a predetermined temperature, indicating cards having means to advance them through advancement by the element imparted from selective locations on the element, said cards having irregular edge portions, and means movable towards the cards so as to engage those irregular edge portions at predetermined locations to eject the cards individually in accordance with service demands of customers represented by the cards.

EVERETT H. BICKLEY.